United States Patent
Mishima et al.

(10) Patent No.: US 8,019,123 B2
(45) Date of Patent: Sep. 13, 2011

(54) MOTION ESTIMATION APPARATUS AND METHOD

(75) Inventors: Nao Mishima, Tokyo (JP); Goh Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 852 days.

(21) Appl. No.: 12/048,887

(22) Filed: Mar. 14, 2008

(65) Prior Publication Data
US 2008/0226193 A1    Sep. 18, 2008

(30) Foreign Application Priority Data
Mar. 15, 2007  (JP) ................. P2007-067470

(51) Int. Cl.
*G06K 9/00* (2006.01)
(52) U.S. Cl. ........... 382/107; 348/154; 348/155; 356/27
(58) Field of Classification Search .................. 382/107; 348/154, 155; 356/27
See application file for complete search history.

(56) References Cited

U.S. PATENT DOCUMENTS

| | | | | |
|---|---|---|---|---|
| 5,787,205 A | * | 7/1998 | Hirabayashi | .................. 382/236 |
| 6,438,254 B1 | * | 8/2002 | Kadono et al. | ................. 382/107 |
| 7,356,172 B2 | * | 4/2008 | Fan et al. | ...................... 382/128 |
| 2005/0248654 A1 | * | 11/2005 | Tsujino et al. | ................. 348/169 |
| 2006/0078206 A1 | | 4/2006 | Mishima et al. | |
| 2006/0193535 A1 | | 8/2006 | Mishima et al. | |
| 2007/0041658 A1 | | 2/2007 | Mishima et al. | |
| 2007/0140529 A1 | * | 6/2007 | Iwabuchi et al. | ............. 382/107 |

OTHER PUBLICATIONS

Xiao, J. et al., "Bilateral Filtering-Based Optical Flow Estimation with Occlusion Detection," ECCV 2006, Part I, LNCS 3951, pp. 211-224, (2006).

* cited by examiner

*Primary Examiner* — Tom Y Lu
(74) *Attorney, Agent, or Firm* — Finnegan, Henderson, Farabow, Garrett & Dunner, L.L.P.

(57) ABSTRACT

An estimation unit calculates an estimated motion vector between a first source region of a plurality of source regions and a first destination region on a destination picture. The first destination region has the highest correlation with the first source region. A weight calculation unit searches a plurality of second destination regions. Each second destination region is pointed by the estimated motion vector of another source region adjacent to the first source region. The weight calculation unit extracts pixel values of each second destination region, calculates a difference of pixel values between the first source region and each second destination region, and calculates a weight based on the difference. The weight is smaller if the difference is larger. A filtering unit calculates a motion vector of the first source region by averaging the estimated motion vectors with the weight.

11 Claims, 8 Drawing Sheets

MOTION ESTIMATION APPARATUS AND METHOD

CROSS-REFERENCE TO RELATED APPLICATIONS

This application is based upon and claims the benefit of priority from prior Japanese Patent Application No. 2007-067470, filed on Mar. 15, 2007; the entire contents of which are incorporated herein by reference.

FIELD OF THE INVENTION

The present invention relates to a motion estimation apparatus and a method for estimating a motion between two adjacent pictures in temporal direction.

BACKGROUND OF THE INVENTION

Various methods for estimating motion between two adjacent pictures in temporal direction are developed. For example, these methods include a block matching method, an optical flow method, a Pel-recursive method, and Bayesian method.

One solving method returns the optical flow method to an anisotropic diffusion equation (an expression described by partial differential equation).

For example, Xiao et al. proposed a method for suitably processing a boundary of motion using Bilateral Filtering. This method is disclosed in "Bilateral Filtering-Based Optical Flow Estimation with Occlusion Detection, J. Xiao, H. Cheng, H. Sawhney, C. Rao and M. Isnardi, ECCV2006".

First, a method prior to Xiao is explained by referring to FIG. 2. In the following explanation, a motion vector representing a motion of each pixel is called a flow.

FIG. 2 is a schematic diagram showing a flow in one-dimension. In FIG. 2, a flow of each pixel between two adjacent pictures is previously estimated as shown in the left part. Furthermore, flow filtering that swung flows are clearly arranged by filtering is shown in the right part.

Next, Xiao et al. improved the prior method by a concept of Bilateral Filtering. This Xiao method is explained by referring to FIG. 3. As shown in FIG. 3, a weight of filtering is calculated as a weight of connection by adding three weights, i.e., a weight of position, a weight of difference between pixel values, and a weight of difference between flows. Briefly, Xiao proposed a flow filtering preserving a boundary of motion.

However, as shown in FIG. 4, if a flow of a source pixel is largely erroneous, the weight of difference between flows badly affects on the weight of connection. As a result, an error flow does not converge to a correct flow.

SUMMARY OF THE INVENTION

The present invention is directed to a motion estimation apparatus and a method for correctly estimating a motion vector between a source picture and a destination picture along a temporal direction.

According to an aspect of the present invention, there is provided an apparatus for estimating motion, comprising: a division unit configured to divide a source picture into a plurality of source regions; an estimation unit configured to calculate an estimated motion vector between a first source region of the plurality of source regions and a first destination region on a destination picture, the first destination region having the highest correlation with the first source region; a weight calculation unit configured to search a plurality of second destination regions on the destination picture, each second destination region being pointed by the estimated motion vector of a second source region adjacent to the first source region, to extract pixel values of each second destination region, to calculate a difference of pixel values between the first source region and each second destination region, and to calculate a first weight based on the difference, the first weight being smaller if the difference is larger; and a filtering unit configured to calculate a motion vector of the first source region by averaging the estimated motion vectors with the first weight.

According to another aspect of the present invention, there is also provided a method for estimating motion, comprising: dividing a source picture into a plurality of source regions; calculating an estimated motion vector between a first source region of the plurality of source regions and a first destination region on a destination picture, the first destination region having the highest correlation with the first source region; searching a plurality of second destination regions on the destination picture, each second destination region being pointed by the estimated motion vector of a second source region adjacent to the first source region; extracting pixel values of each second destination region; calculating a difference of pixel values between the first source region and each second destination region; calculating a weight based on the difference, the weight being smaller if the difference is larger; and calculating a motion vector of the first source region by averaging the estimated motion vectors with the weight.

DETAILED DESCRIPTION OF THE EMBODIMENTS

Figure 1:
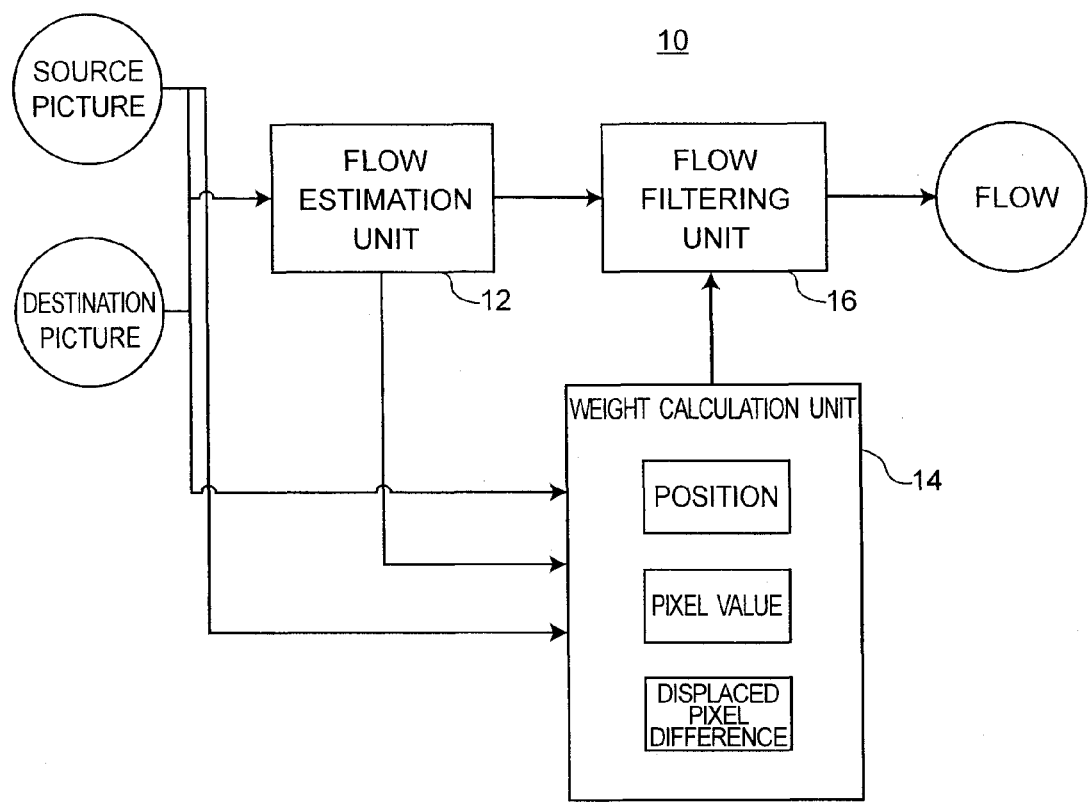
FIG. 1 is a block diagram of the motion estimation apparatus according to the first embodiment.
Figure 2:
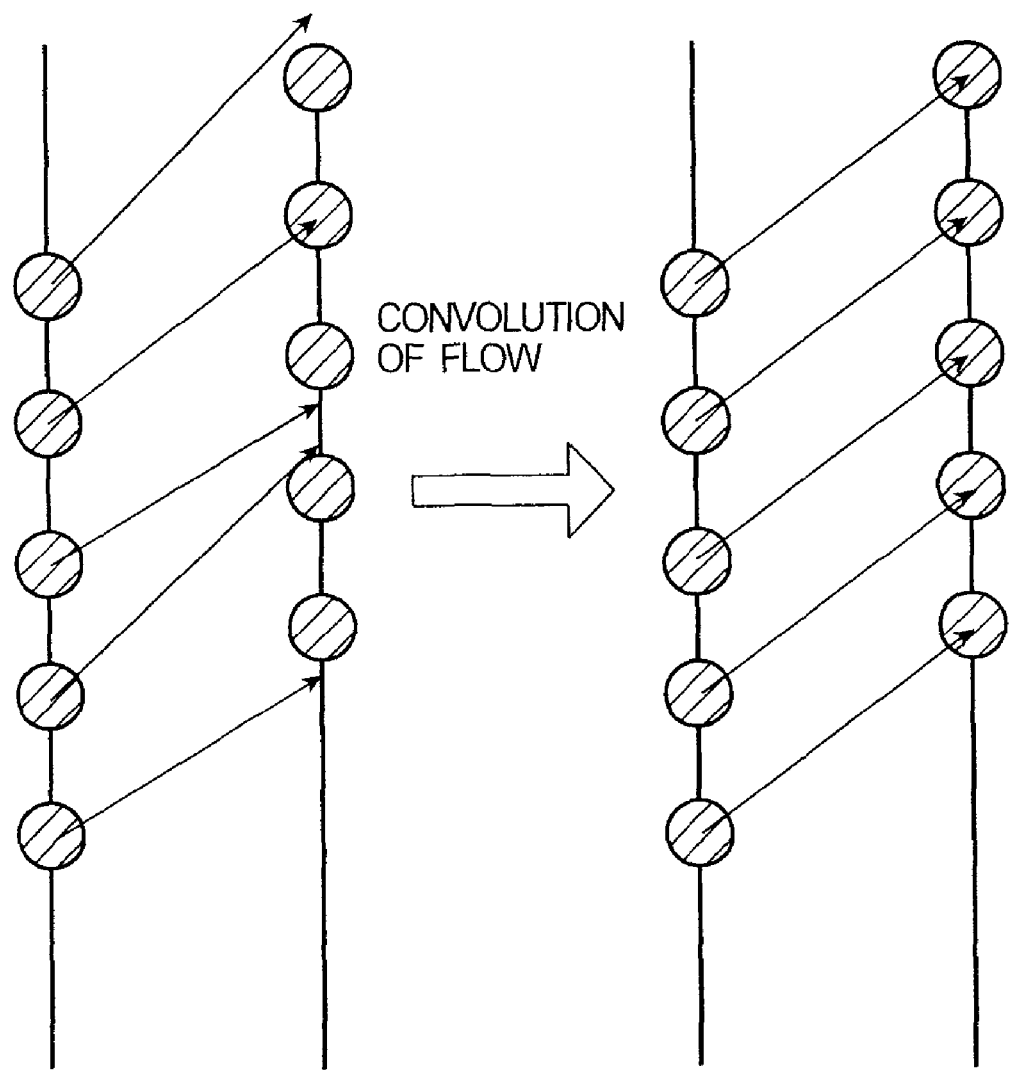
FIG. 2 is a schematic diagram of a flow filtering method according to the prior art.

Hereinafter, various embodiments of the present invention will be explained by referring to the drawings. The present invention is not limited to the following embodiments.

First Embodiment

Figure 5:
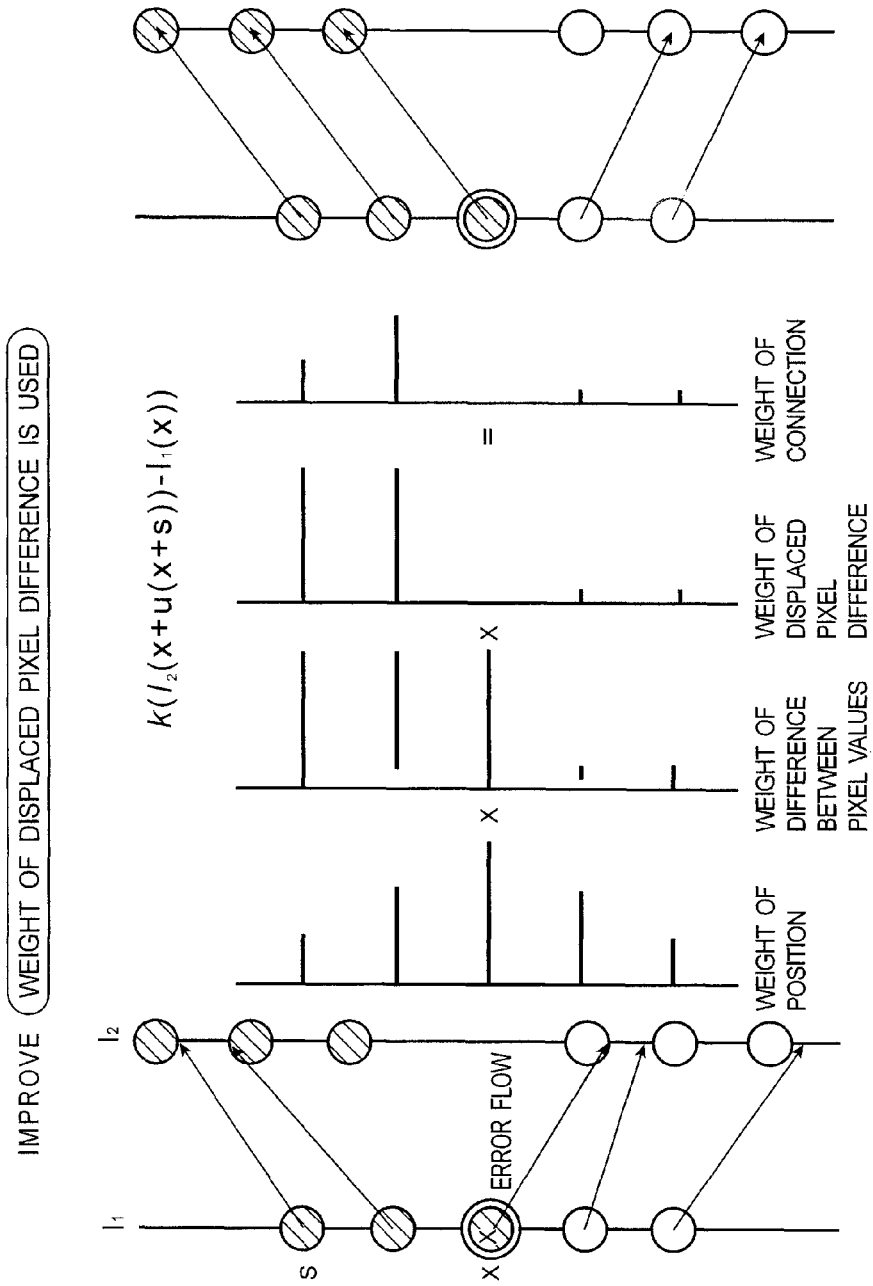
FIG. 5 is a schematic diagram of a flow filtering using displacement according to the first embodiment.
Figure 6:
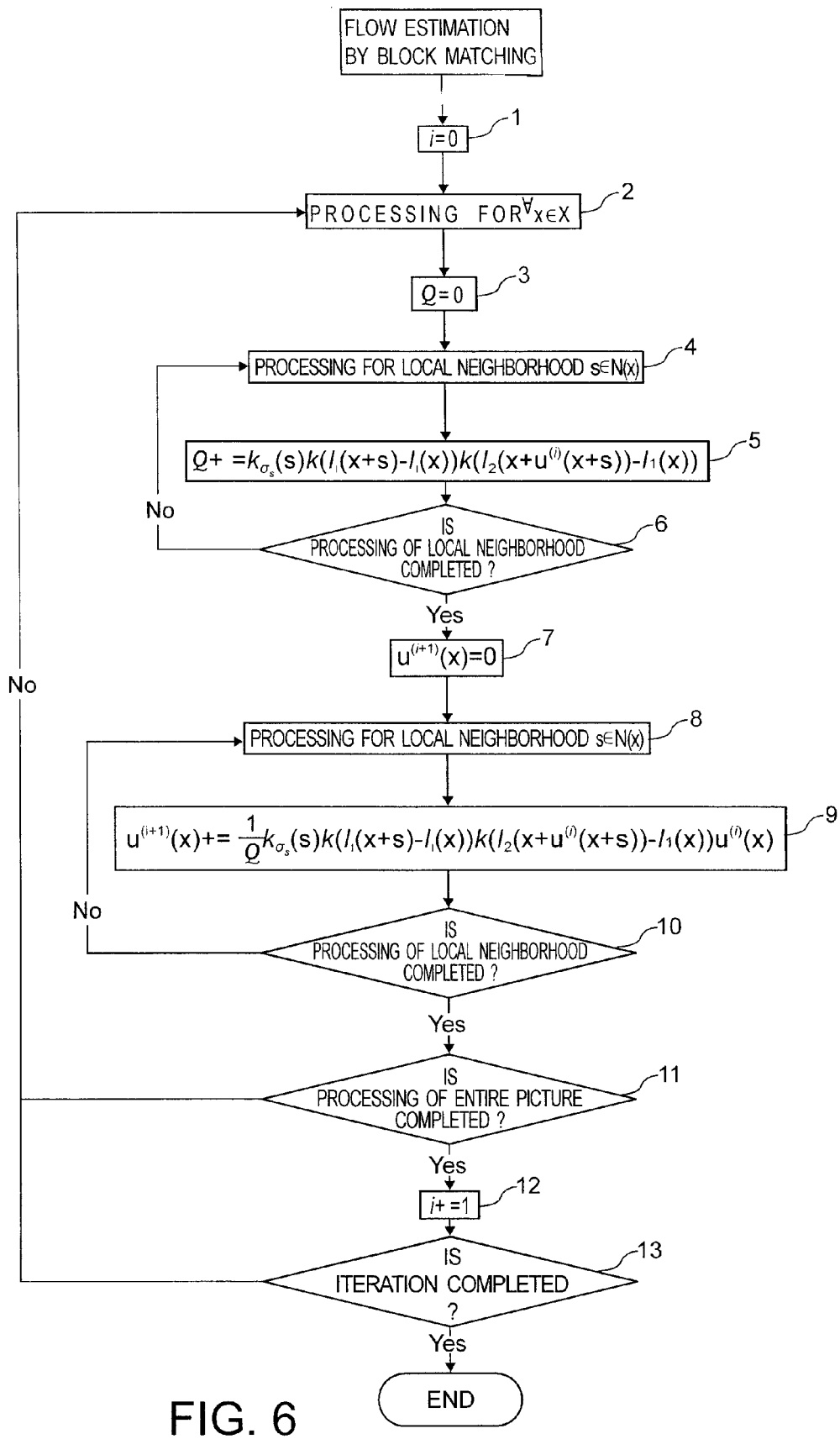
FIG. 6 is a flow chart of processing of the motion estimation apparatus according to the first embodiment.

Hereafter, the motion estimation apparatus 10 of the first embodiment is explained by referring to FIGS. 1, 5, and 6. The motion estimation apparatus 10 detects a flow (motion vector) of pixels from a source picture to a destination picture, when the source picture and the destination picture are input.

(1) Definitions

In the following embodiments, a motion vector is called a flow. Furthermore, the following descriptions are used.

lattice space: $\Lambda^2$
frame: $X \subset \Lambda^2$
point in frame: $x \in X$ $$\text{pixel value in source picture: } I_1(x) \quad (1)$$

pixel value in destination picture: $I_2(x)$
flow: $u(x) \in R^2$ $$\text{position in local region N(x) (local neighborhood of x): } s$$

(2) Components of the Motion Estimation Apparatus

Components of the motion estimation apparatus 10 are explained by referring to FIG. 1. The motion estimation apparatus 10 includes a flow estimation unit 12 and a flow filtering unit 16. The flow estimation unit 12 inputs a source picture and a destination picture. The flow filtering unit 16 outputs a calculated flow. Hereafter, units 12, 14, and 16 are explained by referring to flow charts of FIGS. 1 and 6.

(3) The Flow Estimation Unit 12

An estimation method of a flow u(x) by the flow estimation unit 12 is explained. In general, flow estimation methods include a block matching method, an optical flow method, a Pel-recursive method, and a Bayesian method. In the present embodiment, the block matching method is used. However, the present embodiment is not limited to this method. The optical flow method, the Pel-recursive method, or the Bayesian method may be used.

The source picture is divided into a block B(i) of a rectangle region previously set.

$$B(i) = \{i + (x,y)^T | 0 < x < M_1, 0 < y < M_2\} \quad (2)$$

$i \in X$: left upper point in block
$M_1, M_2$: x size and y size of block
$W \subset X$: region for motion search Then, a block matching algorithm based on SSD (Sum of Squared Difference) is represented as follows.

$$u(i) = \arg\min_{u \in W} E(I,u) \equiv \sum_{x \in B(i)} (I_2(i+u+x) - I_1(i+x))^2 \quad (3)$$

$u(i) \in X$: flow of block i

As to the block matching, it is assumed that each pixel in the same block has the same flow u(x).

$$u(i+x) = u(i), \forall x \in B(i) \quad (4)$$

(4) The Flow Filtering Unit 16

Function of the flow filtering unit 16 is explained. The flow filtering unit 16 calculates a flow u'(x) by filtering (weighted average or convolution) a flow u(x) calculated by the flow estimation unit 12. The flow u'(x) (after filtering) is represented as follows.

$$U'(x) = \frac{\sum_{s \in N(x)} w(x,s) u(x+s)}{\sum_{s \in N(x)} w(x,s)}, \forall x \in X \quad (5)$$

$N(x) \subset X$: local neighborhood for filtering
$W(x,s)$: weight of filtering (determined by weight calculation)

This filtering may be calculated at one time. Alternatively, this filtering may be repeatedly calculated (iteration) as follows.

$$u^{(i+1)}(x) = \frac{\sum_{s \in N(x)} w(x,s) u^{(i)}(x+s)}{\sum_{s \in N(x)} w(x,s)}, \forall x \in X \quad (6)$$

(i), (i+1): iteration
$u^{(0)}(x) = u(x), \forall x \in X$

In this way, filtering with higher accuracy can be operated by iteration.

(5) The Weight Calculation Unit 14

Figure 3:
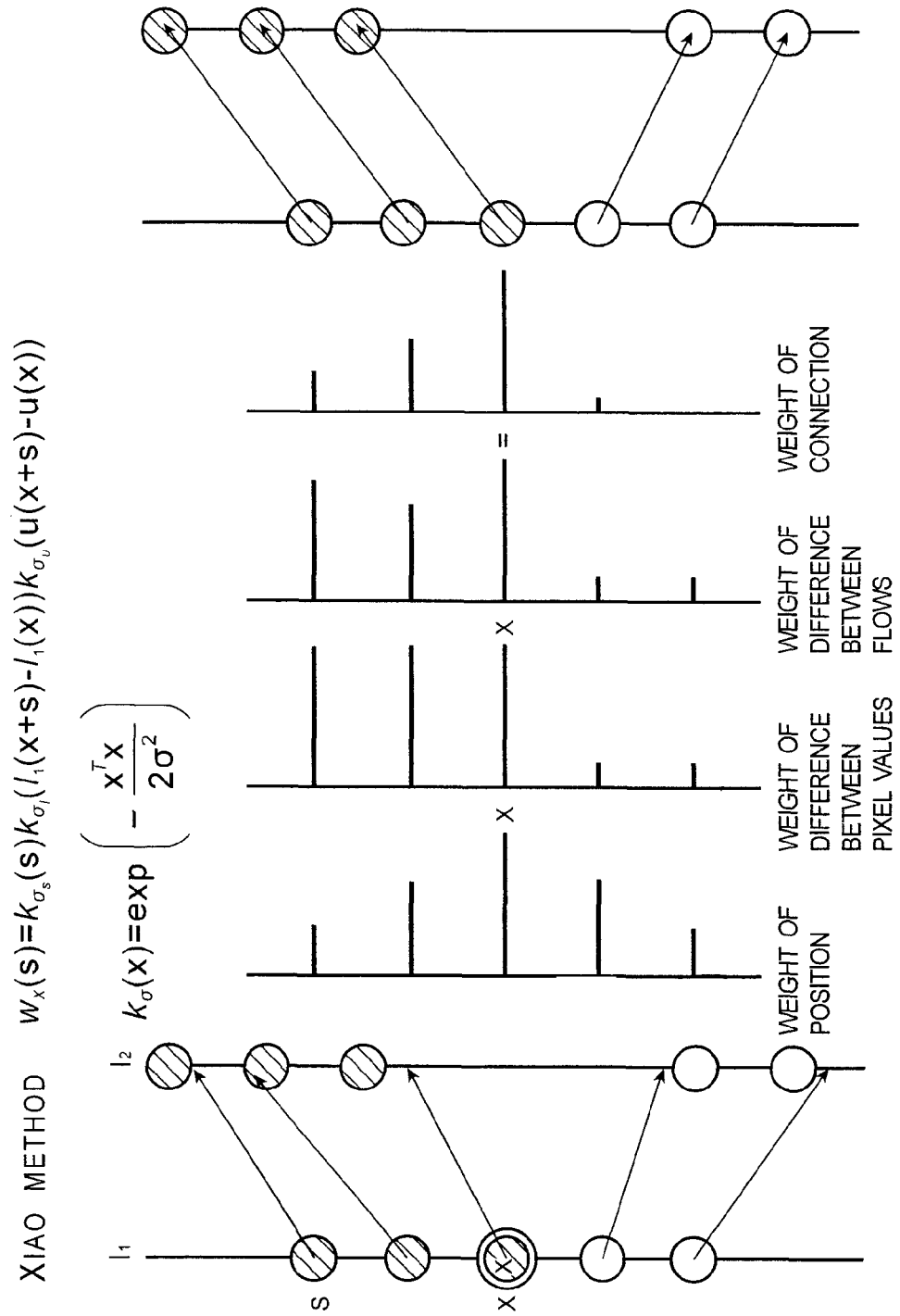
FIG. 3 is a schematic diagram of a flow filtering according to the Xiao method.

Function of the weight calculation unit 14 is explained. The weight calculation unit 14 calculates a weight w(x,s) for weighted average used by the flow filtering unit 16. As shown in FIG. 3, Xiao et al. uses a weight w(x,s) as follows.

$$W(x,s) = k_{\sigma_s}(s) k_{\sigma_I}(I_1(x+s) - I_1(x)) k_{\sigma_v}(u(x+s) - u(x)) \quad (7)$$

$$k_\sigma(x) = \exp\left(-\frac{x^T x}{2\sigma^2}\right): \text{Gaussian function}$$

σ: standard deviation

As shown in FIG. 3, Xiao filtering, a boundary of a flow is preserved by extending Bilateral Filtering to the flow.

In equation (7), the first item is a weight of position, the second item is a weight of difference between pixel values, and the third item is a weight of difference between flows. As to the first item, the shorter a distance between an object pixel and a target pixel on the source picture is, the larger the weight is. As to the second item, the smaller a difference between an object pixel value and a target pixel value on the source picture is, the larger the weight is. As to the third item, the smaller a difference between an object pixel flow and a target pixel flow on the source picture is, the larger the weight is. As a result, in FIG. 3, a boundary of a flow of the pixel x on the source picture $I_1$ is preserved on the destination picture $I_2$.

Figure 4:
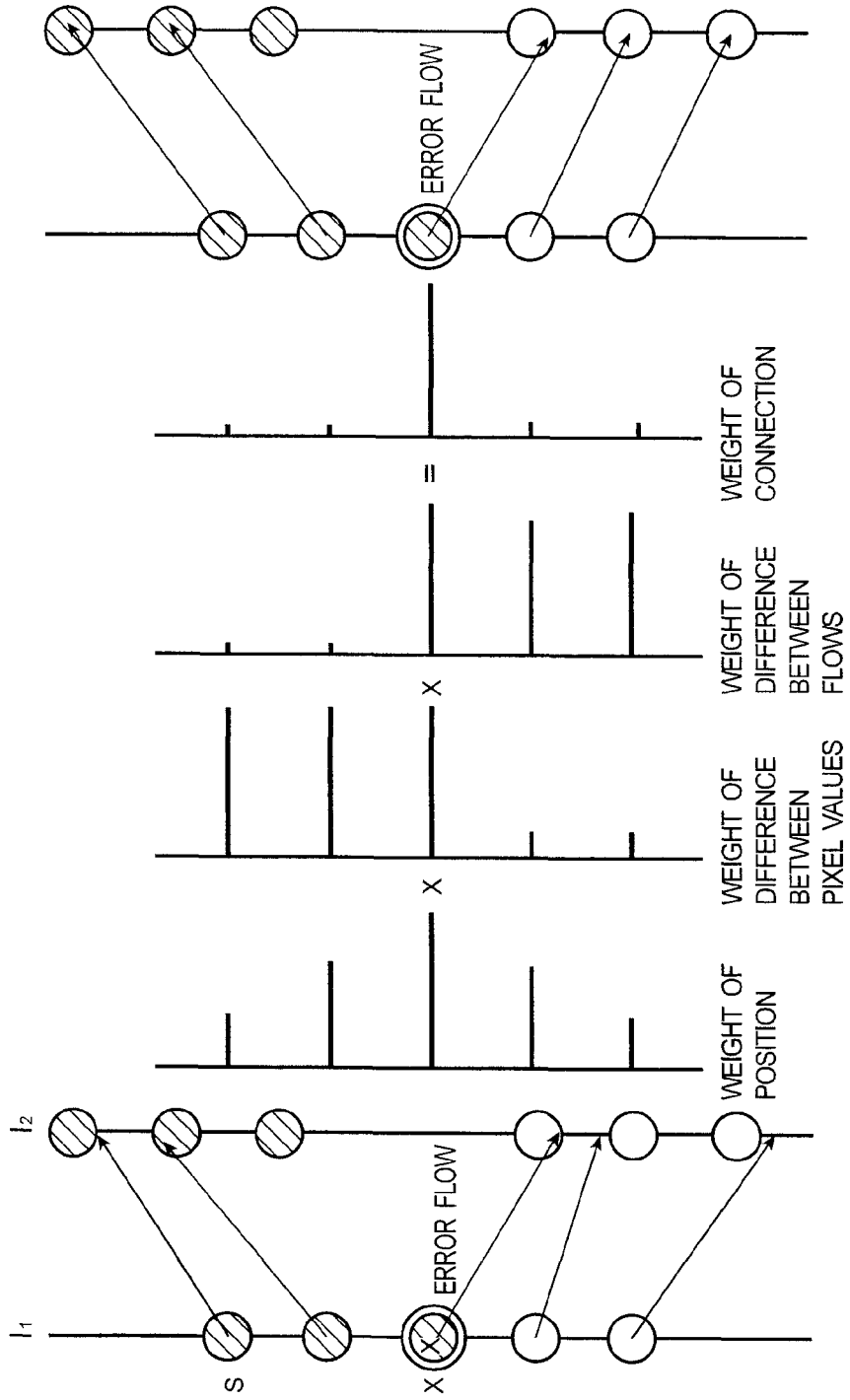
FIG. 4 is a schematic diagram of a problem the flow filtering according to the Xiao method.

However, as shown in FIG. 4, if the boundary of the flow is large, a problem may occur. The case that a source flow of filtering is erroneous is explained. In FIG. 4, the source flow of a pixel x is originally an upper direction, but erroneously a lower direction. In this case, the weight of position and the weight of difference between pixel values are the same as in FIG. 3, but the weight of difference between flows is different from FIG. 3.

As to the weight of difference between flows, ideally, a flow of black pixels adjacent to the source pixel x is desired to be convoluted with a flow of the source pixel x. However, a difference between the flow of each adjacent black pixel and the flow of the source pixel x is large. Accordingly, the weight of adjacent black pixels for the source pixel x is small. Furthermore, as to the weight of difference between pixel values, a difference of pixel values between adjacent white pixels and the source pixel (black) x is large. As a result, as shown in the weight of connection of FIG. 4, only the source pixel x has the large weight of connection. Briefly, convolution is not correctly operated, and correct weight of connection is not assigned to the source pixel x.

In the present embodiment, the above problem is avoided by a displaced pixel difference. As the displaced pixel difference, a flow u(x+s) of a pixel (x+s) adjacent to the source pixel x is applied to the source pixel x. A pixel (on the destination picture $I_2$) pointed to by the flow u(x+s) from the source pixel x is determined. A difference of pixel values between the pointed pixel and the source pixel x is calculated. One example is explained as follows.

First, a flow u(x+s) of a surrounding pixel (x+s) (adjacent to the source pixel x) is applied to the source pixel x on the source picture $I_1$. Briefly, by setting the source pixel x as a start point, the flow u(x+s) points to a destination point (x+u (x+s)) on the destination picture $I_2$. In FIG. 4, "s" represents a pixel in a local region N(x) of the source picture $I_1$, and each pixel (x+s) in the local region N(x) has respectively a flow u(x+s) Accordingly, by respectively applying the flow u(x+s) to the source pixel x, destination points (x+u(x+s)) on the destination picture $I_2$ are pointed to in correspondence with each pixel (x+s)

Next, a pixel value $I_2$(x+u(x+u)) of each destination point (x+u(x+s)) on the destination picture $I_2$ is extracted. Last, a difference between the pixel value $I_2$ (x+u(x+s)) and a pixel value $I_1$(x) of the source pixel x is calculated as the displaced pixel difference.

The displaced pixel difference is represented as follows.

$$I_2(x+u(x+s))-I_1(x)$$

By replacing the third term of the right side in the equation (7) with the displaced pixel difference as one weight, a weight w(x,s) different from Xiao's method (equation (7)) is represented as follows.

$$w(x,s)=k_{\sigma_s}(s)k_{\sigma_I}(I_1(x+s)-I_1(x))k_{\sigma_r}(I_2(x+u(x+s))-I_1(x)) \quad (8)$$

Improvement effect by the displaced pixel difference is explained using FIG. 5. The first term (weight of position) and the second term (weight of difference between pixel values) of the right side in equation (8) are the same as in equation (7). The third term (weight of displaced pixel difference) of the right side in equation (8) operates differently by applying the flow u(x+s) to the source pixel x. When the displaced pixel difference becomes large, the weight becomes small. On the other hand, when the displaced pixel difference becomes small, the weight becomes large. This operation is based on a value of "$I_2$(x+u(x+s))-$I_1$" multiplied with a Gaussian function (minus "exp"). Because, if the displaced pixel difference is large, applying the flow u(x+s) to the source pixel x is not reliable. In this case, assume that the same object has the same pixel value I on both the source picture and the destination picture.

In case of FIG. 5, the weight of displaced pixel value is calculated to be smaller for flows (including a flow of the source pixel x) directed to the lower side. In other words, only flows directed to the upper side are convoluted with the source pixel x. As a result, a flow of the source pixel x converges as a correct flow directed to the upper side. By using the weight w(x,s), the flow filtering unit 16 calculates a weighted average of equation (5).

(6) Processing Contents

Processing contents of the motion estimation apparatus 10 are explained by referring to FIG. 6.

First, at step 1, a point "i=0" is set as an initial value. Next, at steps 2~6, as to each pixel s in the local region N(x), the weight w(x,s) is calculated by equation (8). Next, at steps 7~10, as to each pixel s, a flow u(x) is calculated using the weight w(x,s). Next, at step 11, processing of steps 2~10 is repeated until processing of all pixels of the source picture $I_1$ is completed. Last, at step 13, steps 2~11 are iterated until increment of the point I is completed.

(7) Effect

In the first embodiment, after calculating a flow of a block by the block matching method, a flow of each pixel in the block is refined by flow filtering. Accordingly, the flow of each pixel can be estimated with high accuracy.

(8-1) Modification 1

In the first embodiment, the weight w(x,s) is calculated by the equation (8). However, in order to simplify the calculation, the weight w(x,s) may be calculated by following equation.

$$w(x,s)=k_{\sigma_s}(s)k_{\sigma_I}(I_1(x+s)-I_1(x))k_{\sigma_r}(I_2(x+s+u(x+s))-I_1(x)) \quad (9)$$

In equation (9), a destination pixel value "$I_2$(x+s+u(x+s))" is collectively determined.

For example, a flow u(x+s) of a surrounding pixel (x+s) (adjacent to the source pixel x) is not applied to the source pixel x. A pixel value of a destination pixel (on the destination picture $I_2$) pointed to by the flow u (x+s) from the surrounding pixel (x+s) is determined. A difference of pixel values between the destination pixel (x+s+u(x+s)) and the source pixel x is calculated. The weight of displaced pixel difference is calculated based on the difference. As a result, flow filtering can be quickly calculated.

(8-2) Modification 2

The combination of each weight is not limited to equation (8). The combination may be freely varied as following equation (10).

$$W(x,s)=k_{\sigma_s}(s)k_{\sigma_r}(I_2(x+u(x+s))-I_1(x))$$

$$W(x,s)=k_{\sigma_I}(I_1(x+s)-I_1(x))k_{\sigma_r}(I_2(x+u(x+s))-I_1(x)) \quad (10)$$

$$W(x,s)=k_{\sigma_s}(s)k_{\sigma_I}(I_1(x+s)-I_1(x))k_{\sigma_r}(u(x+s)-u(x))k_{\sigma_r}(I_2(x+u(x+s))-I_1(x))$$

In equation (10), a weight w(x,s) of the first equation is a product of the first term and the third term (specific feature of the first embodiment) of the right side of equation (8). A weight w(x,s) of the second equation is a product of the second term and the third term (specific feature of the first embodiment) of the right side of equation (8). A weight w(x,s) of the third equation is a product of the first term and the second term of equation (8), the first term of the right side of equation (7), and the third term (specific feature of the first embodiment) of the right side of equation (8). In this way, the weight w(x,s) may be calculated using at least the third term of the right side of equation (8).

Second Embodiment

Figure 7:
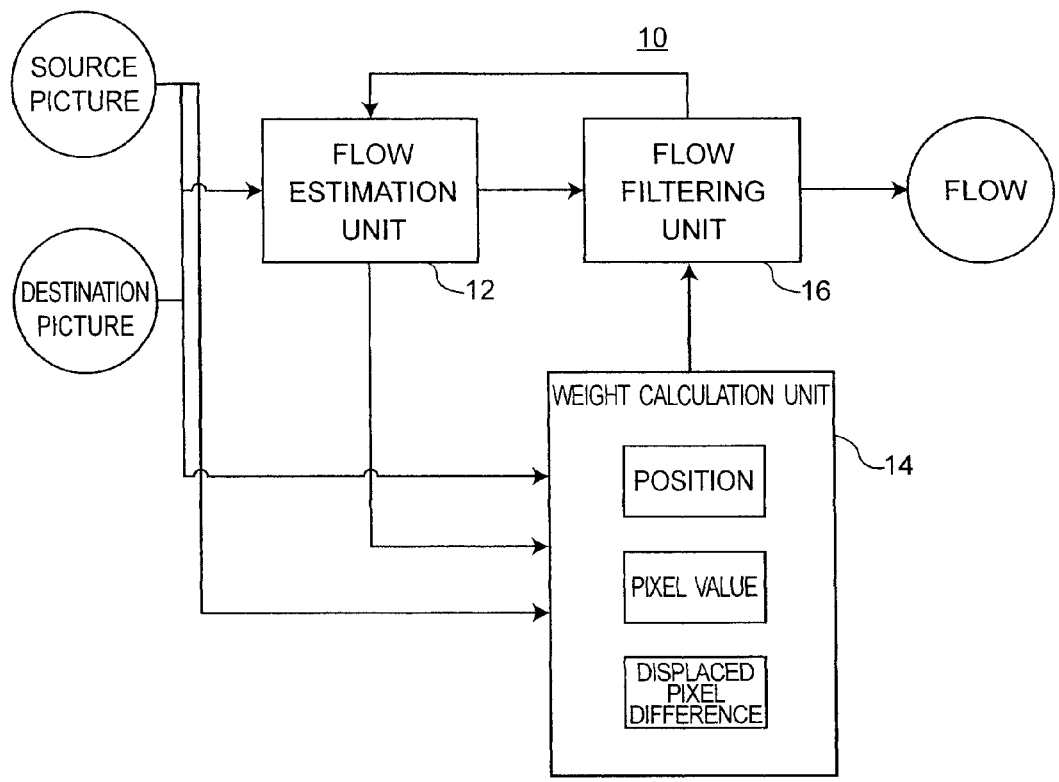
FIG. 7 is a block diagram of the motion estimation apparatus according to the second embodiment.
Figure 8:
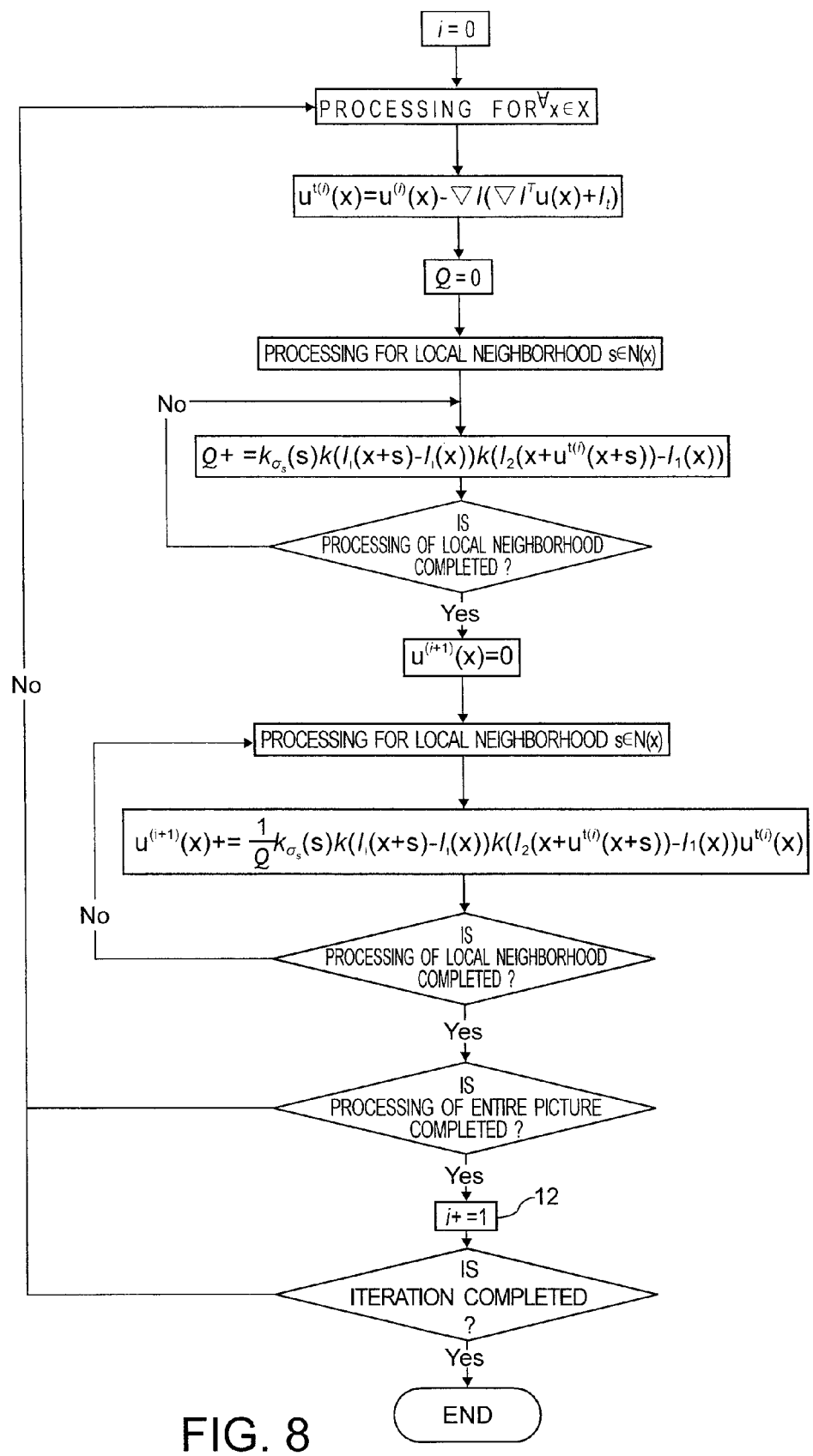
FIG. 8 is a schematic diagram of a flow chart of processing of the motion estimation apparatus according to the second embodiment.

The motion estimation apparatus 10 of the second embodiment is explained by referring to FIGS. 7 and 8. In the second embodiment, as shown by Xiao, a flow is accurately calculated by iterating a flow estimation and a flow filtering.

(1) Components of the Motion Estimation Apparatus 10

Components of the motion estimation apparatus 10 are explained by referring to FIG. 7. The motion estimation apparatus 10 includes the flow estimation unit 12, the weight calculation unit 14, and the flow filtering unit 16. The flow estimation unit 12 inputs a source picture and a destination picture, and the flow filtering unit 16 outputs a calculated flow. Hereafter, units 12, 14, and 16 are explained by referring to FIGS. 7 and 8.

(2) The Flow Estimation Unit 12

In the second embodiment, a flow is estimated for each pixel on a picture. Concretely, an energy of the picture is defined for each flow. If a flow conforms to the picture, the energy lowers. By minimizing the energy, the flow suitable for the picture is obtained.

First, the energy of the picture is defined as follows.

$$E_f(u(x))=(I_2(x+u(x))-I_1(x))^2 \quad (11)$$

In this case, "$I_2(x+u(x))$" is approximated with first order by Tailor expansion as follows.

$$E_I(u(x)) = (\nabla I^T u(x) + I_t)^2 \quad (12)$$

$\nabla I$: average gradient of $I_1$ and $I_2$
$I_t$: temporal differentiation

The equation (12) corresponds to an optical flow constraint equation. All energy U of the picture is represented as follows.

$$U(u) = \sum_{x \in X} E_I(u(x)) \quad (13)$$

A flow to minimize the all energy is a solution of "min U (u)". By applying a steepest descent method, the flow is represented as follows.

$$u'^{(i)}(x) - u^{(i)}(x) = -\frac{\partial E_I(u(x))}{\partial u(x)} = -\nabla I(\nabla I^T u(x) + I_t), \forall x \in X$$

This equation represents an updated equation to progress flow estimation from $u^{(i)}(x)$ to $u'^{(i)}(x)$.

(3) The Weight Calculation Unit 14

The weight calculation unit 14 is the same as in the first embodiment. While mutually executing the flow estimation unit 12 and the flow filtering unit 16, a flow is accurately estimated by iterating as a whole.

(4) The Flow Filtering Unit 16

The flow filtering unit 16 filters a flow using a weight $w(x, s)$ (calculated by the weight calculation unit 14) as follows.

$$u^{(i+1)}(x) = \frac{\sum_{s \in N(x)} w(x, s) u'^{(i)}(x+s)}{\sum_{s \in N(x)} w(x, s)}, \forall x \in X$$

Third Embodiment

The motion estimation apparatus 10 of the third embodiment is explained by referring to FIG. 1. In the first embodiment, a flow is filtered for each pixel in a picture. However, in the third embodiment, a flow is filtered for each block (region) in the picture.

(1) Definition

Following descriptions are used.
lattice space: $\Lambda^2$
frame: $X \subset \Lambda^2$
point in frame: $x \in X$ $$\text{pixel value in source picture: } I_1(x) \quad (15)$$

pixel value in destination picture: $I_2(x)$
block number for filtering: $i \in \Lambda^2$
i-th block for filtering: $B(i) \subset X$
flow: $u(x) \in R^2$ (2) The Flow Estimation Unit 12

The flow estimation unit 12 is the same as in the first embodiment.

(3) The Flow Filtering Unit 16

The flow filtering unit 16 filters (filtering) a flow (calculated by the flow estimation unit 12). Different from the first embodiment, filtering proceeds in block-by-block (not each pixel). A flow u'(x) is represented after filtering as follows.

$$u'(i) = \frac{\sum_{s \in N(i)} w(i, s) u(i+s)}{\sum_{s \in N(i)} w(i, s)}, \forall i \in \Lambda^2 \quad (16)$$

$N(i) \subset X$: local neighborhood for filtering
$w(i,s)$: weight of filtering (by weight calculation step)

As to equation (16), the filtering may be operated one time. Alternatively, the filtering may be operated by iteration as follows.

$$u^{(n+1)}(i) = \frac{\sum_{s \in N(i)} w(i, s) u^{(n)}(i+s)}{\sum_{s \in N(i)} w(i, s)}, \forall i \in \Lambda^2 \quad (17)$$

(n), (n+1): iteration
$u^{(0)}(i) = u(i), \forall i \in \Lambda$

In this way, filtering can be accurately operated by iteration.

(4) The Weight Calculation Unit 14

The weight calculation unit 14 calculates a weight of filtering used by the flow filtering unit 16. Different from the first embodiment, filtering proceeds in block-by-block (not each pixel).

A displaced pixel difference of a block is explained. First, a flow of a surrounding pixel (adjacent to a source pixel) is applied to the source pixel in the block, and a displaced pixel difference of the source pixel is calculated. This processing is repeated whenever each pixel in the block is set as a source pixel. Next, an average of the displaced pixel difference of each source pixel in the block is calculated as the displaced pixel difference of the block. The processing is then repeated for each block in the picture.

An equation to calculate the displaced pixel difference of the block is represented as follows.

$$\frac{1}{Num(B(i))} \sum_{x \in B(i)} (I_2(x+u(i+s)) - I_1(x)) \quad (18)$$

$Num(B(i))$: number of pixels in block $B(i)$

The displaced pixel difference is added as one item of an weight. An equation to calculate the weight is represented as follows.

$$w(i, s) = k_{\sigma_s}(s) k_{\sigma_I}(\bar{I}_1(i+s) - \bar{I}_1(i)) \quad (19)$$

$$k_{\sigma_r}\left\{\frac{1}{Num(B(i))} \sum_{x \in B(i)} (I_2(x+u(i+s)) - I_1(x))\right\}$$

$\bar{I}_1(i)$: average pixel value in block, $\bar{I}_1(i) = \frac{1}{Num(B(i))} \sum_{x \in B(i)} I_1(x)$ As to the equation (19), weight calculation of a pixel in the first embodiment is extended to a block. Actually, in case of "1×1" block, i.e., if a pixel is regarded as a block, "i=x, B(i)={x}" is concluded, and the weight of the equation (19) in equivalent to the weight of the first embodiment. Briefly, a filtering unit is not limited to a pixel. The filtering unit can be extended to a block of a predetermined size having a plurality of pixels.

In the disclosed embodiments, the processing can be accomplished by a computer-executable program, and this program can be realized in a computer-readable memory device.

In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for estimating motion, comprising:
a division unit configured to divide a source picture into a plurality of source regions;
an estimation unit configured to calculate an estimated motion vector between a first source region of the plurality of source regions and a first destination region on a destination picture, the first destination region having the highest correlation with the first source region;
a weight calculation unit configured to search a plurality of second destination regions on the destination picture, each second destination region being pointed by the estimated motion vector of a second source region adjacent to the first source region, to extract pixel values of each second destination region, to calculate a difference of pixel values between the first source region and each second destination region, and to calculate a first weight based on the difference, the first weight being smaller if the difference is larger; and
a filtering unit configured to calculate a motion vector of the first source region by averaging the estimated motion vectors with the first weight.

2. The apparatus according to claim 1,
wherein the weight calculation unit applies the estimated motion vector of the second source region to the first source region as a start point on the source picture, and searches the second destination region pointed by the estimated motion vector on the destination picture.

3. The apparatus according to claim 1,
wherein the weight calculation unit calculates a second weight being smaller if the first source region is more depart from the second source region on the source picture, and calculates a product of the first weight and the second weight for weighted average of the estimated motion vectors.

4. The apparatus according to claim 1,
wherein the weight calculation unit calculates a third weight being smaller if a difference of the pixel values between the first source region and the first destination region is larger, and calculates a product of the first weight and the third weight for weighted average of the estimated motion vectors.

5. The apparatus according to claim 1,
wherein the weight calculation unit calculates a fourth weight being smaller if a difference of the estimated motion vector between the first source region and the second source region, and calculates a product of the first weight and the fourth weight for weighted average of the estimated motion vectors.

6. The apparatus according to claim 1,
wherein the filtering unit calculates the motion vector by repeatedly averaging with weight.

7. The apparatus according to claim 1,
wherein calculation of the estimated motion vector by the estimation unit and calculation of the motion vector by the filtering unit are mutually repeated.

8. The apparatus according to claim 1,
wherein the estimation unit calculates the estimated motion vector by the block matching method.

9. The apparatus according to claim 1,
wherein the estimation unit minimizes the estimated motion vector by updating an energy along a descend direction, and
the energy is determined by a difference of pixel values between the first source region and the first destination region.

10. The apparatus according to claim 1,
wherein the first source region and the first destination region comprises blocks equally having one pixel or a plurality of pixels.

11. A method for estimating motion, comprising:
dividing a source picture into a plurality of source regions;
calculating an estimated motion vector between a first source region of the plurality of source regions and a first destination region on a destination picture, the first destination region having the highest correlation with the first source region;
searching a plurality of second destination regions on the destination picture, each second destination region being pointed by the estimated motion vector of a second source region adjacent to the first source region;
extracting pixel values of each second destination region;
calculating a difference of pixel values between the first source region and each second destination region;
calculating a weight based on the difference, the weight being smaller if the difference is larger; and
calculating a motion vector of the first source region by averaging the estimated motion vectors with the weight.

* * * * *